July 5, 1955 F. J. MARGOLIS 2,712,237
CLINICAL THERMOMETER
Filed Aug. 14, 1951 2 Sheets-Sheet 1
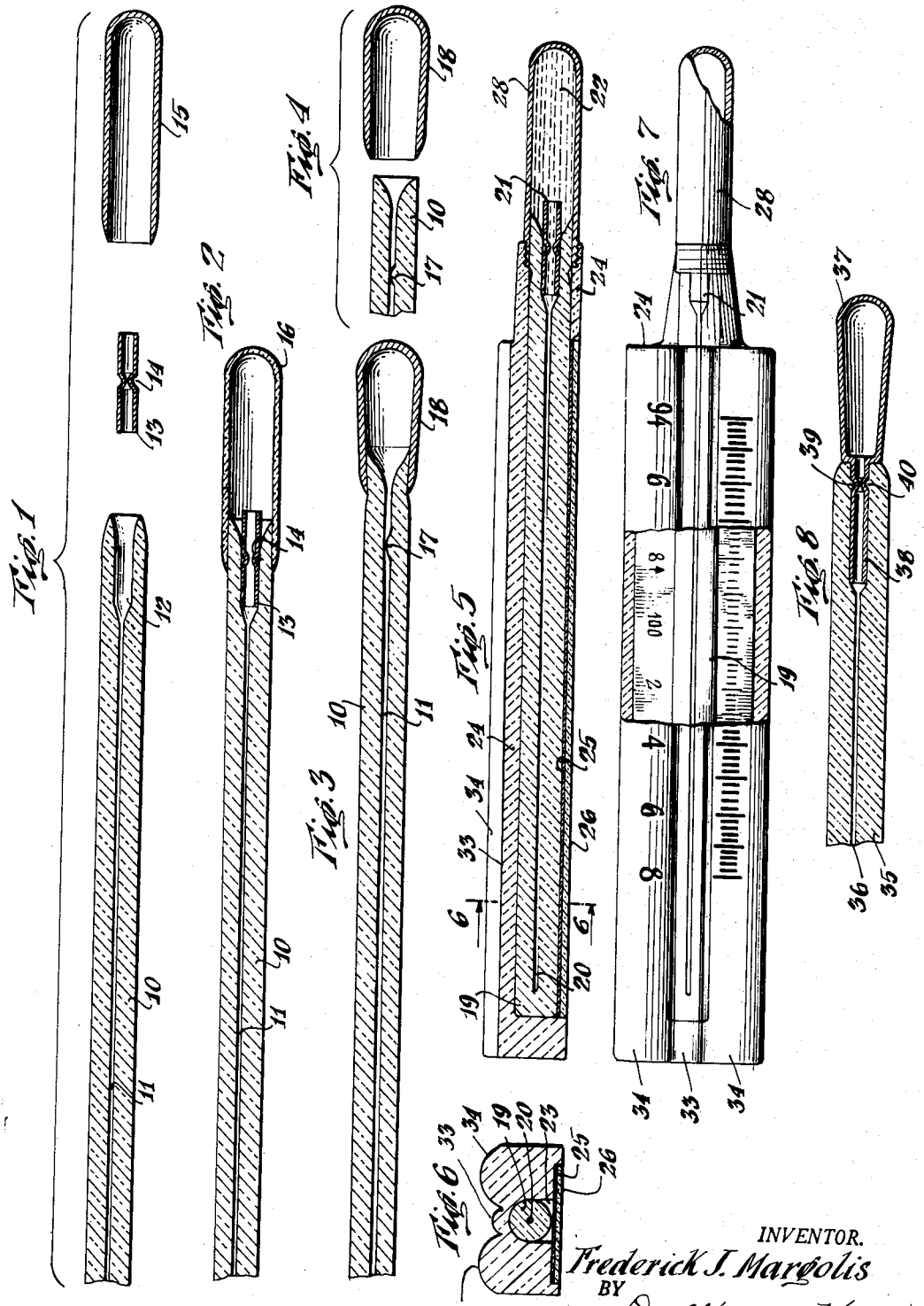
INVENTOR.
Frederick J. Margolis
BY
Duell and Kane
ATTORNEYS July 5, 1955  F. J. MARGOLIS  2,712,237
CLINICAL THERMOMETER
Filed Aug. 14, 1951  2 Sheets-Sheet 2
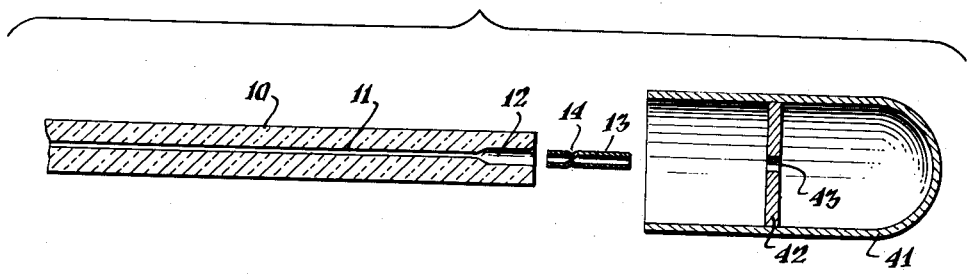
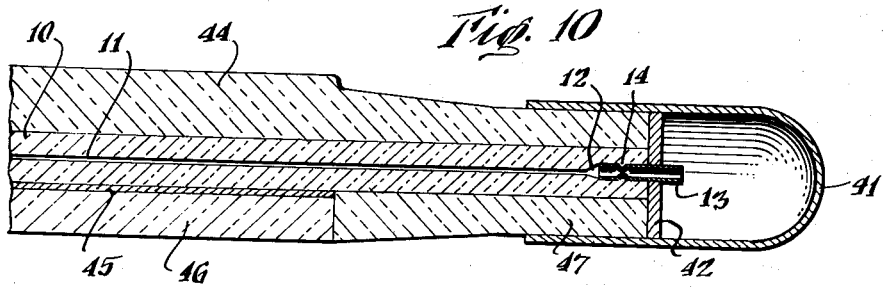
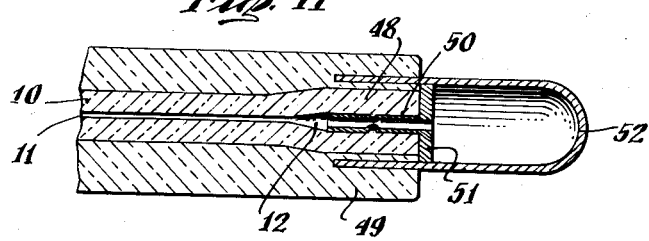
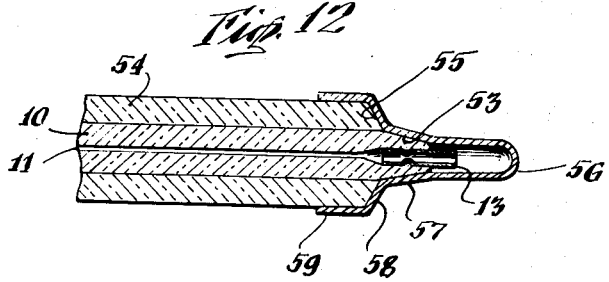
INVENTOR.
Frederick J. Margolis
BY Duell and Kane

United States Patent Office 2,712,237
Patented July 5, 1955

2,712,237

CLINICAL THERMOMETER

Frederick J. Margolis, Kalamazoo, Mich.

Application August 14, 1951, Serial No. 241,711

7 Claims. (Cl. 73—371)

This invention relates to a structurally and functionally improved thermometer and especially a thermometer of the clinical type.

It is an object of the invention to provide a thermometer structure and as a result of which the unit will accurately and properly register temperatures; the unit being moreover highly resistant to breakage.

A further object is that of furnishing a thermometer the several parts of which may readily be manufactured and combined in accordance with the present teachings so that the device may be economically manufactured and be subject to use free from objections which have heretofore been noted in connection with units of this type.

With these and other objects in mind reference is had to the attached sheet of drawings illustrating practical embodiments of the invention and in which:

Fig. 1 is a sectional side view of an assembly by means of which the thermometer is provided;

Fig. 2 is a similar view showing a complete thermometer embodying a glass bulb;

Fig. 3 is a view similar to Fig. 2 but showing an alternative form of structure;

Fig. 4 shows the parts which provide the structure of Fig. 3 in separated condition;

Fig. 5 is a view similar to Figs. 2 and 3 but showing a further form of structure;

Fig. 6 is a transverse sectional view taken along the line 6—6 and in the direction of the arrows as indicated in Fig. 5;

Fig. 7 is a face view of the unit as shown in Fig. 5 with certain of the parts broken away and others shown in section;

Fig. 8 is a fragmentary sectional end view of a still further form of structure within the province of the present teachings;

Fig. 9 is a sectional view showing certain of the parts of a further thermometer structure;

Fig. 10 is an enlarged sectional side view of the complete assembly as illustrated in Fig. 9;

Fig. 11 is a similar view of an alternative structure; and

Fig. 12 is a still further view of this further type illustrating another form of the device.

Referring primarily to Figs. 1 and 2 the numeral 10 indicates a tube preferably of glass and conveniently identical with the composition of glass tubing as heretofore employed in the manufacture of thermometers and especially clinical units. This tubing may have any desired sectional configuration and dimension. It is provided with a bore 11. The diameter of this bore may, in the usual manner, be on the order of .001". In these views, as well as in Fig. 3, the outer end of the tubing has been shown as broken off. Such showing is resorted to in order that the top chamber and other structural features forming a part of the assembly during its manufacture do not have to be illustrated. These structures are well known and the manufacturing techniques involving them are also thoroughly understood by those conversant with this art. Suffice it to say that structures of this nature and procedures to be followed in connection with those structures should be resorted to in the providing of a complete thermometer unit in accordance with the present teachings.

Thus, returning to Fig. 1, the rear or "bulb" end of the tube 10 is formed with an enlargement 12 of bore 11. A tube 13 of metal is provided and has an external diameter such that it may be received within the recess or enlargement 12. The bore of this tube 13 is many times larger than bore 11. In a manner hereinafter taught, the bore of tube 13 is reduced to provide a constriction 14. This reduced part may be furnished at a central point or intermediate that point and the ends of tube 13. Again, in accordance with conventional practice, this constriction may have a diameter of around .0003". The length of tube 13 is such that it may be received to a greater or lesser extent into the recess 12.

As suggested in Fig. 2 after tube 13 is inserted into the enlargement or recess 12, heat is applied to the tubing 10. The temperature will be sufficiently high to cause a fusing of the glass of tube 10 around the adjacent exterior surfaces of tube 13 thus locking these parts against movement with respect to each other. So retained the bore of tube 13 will align with and be in communication with bore 11.

In Fig. 1 a cap 15 providing a bulb portion is formed of metal. If tube 13 is positioned in the manner described then this bulb may be ensleeved over the adjacent end of tube 10. With a proper application of heat, the material of tube 10 will fuse into contact with the surfaces of bulb cap 15. Therefore, an airtight connection will be established between these parts. Those portions of the assembly which are formed of metal should employ metal of a class having a coefficient of expansion as nearly as possible equal to that of the glass providing tube 10.

In Fig. 2 the completely assembled structure has been shown excepting only that in this view the bulb cap 16 is conveniently formed of glass. Aside from this, the structures are substantially identical and, as will be noted, the bulb 16 surrounds the outer end of tube 13; the glass material of tube 10 and the bulb being fused one into the other. In both the structures shown in Figs. 1 and 2 the bulb and bore of the unit are filled with mercury or some other proper thermally responsive material. As previously brought out the various incidental steps necessary to furnish the complete thermometer have not been shown or described. However, as a consequence of that conventional procedure the bore 11, tube 13 and bulb 15 or 16 receive the necessary material in the required volumes. In order not to unduly confuse the illustrations shoulders, flanges, recesses and other surface portions have not been illustrated and by means of which a proper engagement of the faces of the several parts may be assured. The desirability or need for such surfaces may readily be met according to the needs of any given thermometer design or type.

In the form of structure shown in Figs. 3 and 4, there is again illustrated the glass tube 10 provided with the bore 11. However, in these structures the constriction schematically indicated at 17 may form a part of the tube bore in accordance with conventional practice. Beyond this constriction the bore is enlarged so as to merge properly with the inner face of a bulb 18 formed of metal. This bulb is secured to tube 10 by heating the latter in the manner aforedescribed and then causing the material of the tube to fuse into contact with and around the adjacent surfaces of the bulb.

In Figs. 5, 6, and 7 a glass tube 19 provided with a bore 20 is utilized. This tube corresponds to the tube 10. The outer end of the tube is shown in completed condition. The thermometer is illustrated as including a metal bulb 28 and this, together with the adjacent end of the constriction-providing tube 21 is filled with mercury 22 or other suitable material. The surfaces of the tube 10, as shown in Figs. 1 to 3, receive indicia providing scale marks in the usual manner. In the case of the structures illustrated in Figs. 5, 6 and 7 this indicia is associated with a tube enclosing or mounting member 24.

As shown, this member includes a body preferably formed of plastic. The rear face of the body is provided with a groove 23 having a width equal to the external diameter of tube 19. Adjacent this groove the rear face of the plastic body 24 may be recessed. The depth of this recess is such that it conveniently receives a strip 25 which carries indicia on its face and beyond which is disposed a closure strip 26. These strips may be formed of plastic and are secured in position by adhesive or in any other desired manner.

In Fig. 7 a top plan view of the parts as shown in Figs. 5 and 6 is illustrated. In all three of these figures the central portion of body 24 overlying tube 19 is curved to provide a lens 33. Similarly lenses 34 are disposed one to each side of the lens portion 33 and extend longitudinally of the unit to furnish structures which overlie the indicia upon strip 25 to either side of tube 19. In this manner such indicia will be clearly visible. Also, the lens portions 34 extending beyond portion 33, it follows that the latter will be protected from scratching and marring. A screw threaded connection is preferably provided between the inner end of bulb 28 and the adjacent end of body 24 to assure a retention of these units against movements with respect to each other with tube 19 abutting the adjacent face of body 24 and bulb 28 sealingly engaging that tube. Obviously other forms of connection might be employed.

In Fig. 8 a glass tube 35 formed with a bore 36 is provided. This tube corresponds to the tubes heretofore described. A bulb 37 of metal is also provided and formed with a reduced forward tube part 38 embracing a constriction 39. Bulb 37 may either be integral with tube 38 or else these parts may be joined after they are initially provided. In any event, with heat properly applied to the end of tube 35 the glass of that tube will fuse into sealing contact with the surfaces of tube 38 and the upper end of bulb portion 37. Also, as indicated at 40, it may key into the outer surface of the depression providing constriction 39. This same result may obtain in the structures shown in the earlier figures.

In Fig. 9 an alternative form of structure has been shown again including a glass tube which is provided with the usual capillary bore 11. The rear or base end of this bore is enlarged as at 12 and receives a metallic tube 13 provided with a constriction 14. In this view as well as in certain subsequent views the constriction has been shown as more nearly adjacent one end of the tube 13 than the center thereof. This, of course, is optional. A metallic bulb 41 has associated with it in any desired manner a washer 42. The latter is formed with a preferably central perforation 43 the diameter of which is such that it may receive the body of tube 13 which extends through the same as shown in Fig. 10.

As illustrated in the latter view as well as in Fig. 9, the diameter of the free edge of bulb 41 is materially greater than the diameter of tube 10. Therefore, as taught in connection with Figs. 5, 6 and 7 a plastic holder 44 may be employed to receive and mount tube 10. An indicia strip 45 is again preferably disposed within a recess formed in body 44 and underlying tube 10. A closure or sealing strip 46 may be disposed beyond strip 45. These parts are secured in position by any desired expedient. In any event the end 47 of body 44 may be reduced and define an outside diameter equal to the internal diameter of bulb 41. Therefore, as shown in Fig. 10, it may be received within the forward end of the bulb at a point in advance of the washer 42.

Tube 13 has fused into contact with its exterior faces the material of tube 10. That tube is also fused into sealing contact with the adjacent face of washer 42. Any suitable coupling or securing expedient may be resorted to between bulb 41 and washer 42 and the adjacent surfaces of extended portion 47. In any event a structure is furnished in which the fragile portions of the assembly are either completely housed and protected or else are replaced by parts which are not readily frangible.

As shown in Fig. 11 the end of tube 10 in having its bore enlarged to provide the recess 12 may have its outside diameter increased as indicated at 48. The end of a plastic member 49 has been shown as provided with a bore to receive the tube 10. The metallic tube 50 incorporating the constriction has its end flanged outwardly or else is united with a washer portion 51. The metallic bulb 52 receives this washer in a manner similar to that heretofore described. The forward end of this bulb is of a sufficiently large diameter that it may receive and extend beyond the enlarged portion 48 of tube 10. Accordingly, if the rear end of body 49 is slotted or grooved, this protecting edge zone of the bulb is disposed in the slot. The parts are united in any desired manner to prevent movements with respect to each other.

Finally, as in Fig. 12, the glass tube 10 has its bore enlarged to receive the metallic tube 13. These parts are fused together as heretofore described. The adjacent end surface 53 of tube 10 may be somewhat conical. A metallic bulb 56 is provided with surfaces which are flared as at 57 to a degree corresponding to the tapered faces 53. Therefore a fusing may occur between these faces to secure them against movement. Beyond portion 57 the metallic element providing the bulb is extended as at 58 to conform to the end surface of body 54. It is continued in the form of a cylindrical portion 59 which ensleeves the adjacent face of body 54. Adhesive or any other suitable form of connection may be furnished at this point.

To incorporate the constriction in the metallic tubes 13, 21, 38 and 54 a length of tubing may, in each instance, be provided. This tubing is connected to a source of fluid under pressure. Conveniently such fluid is air and it may be contained in a flask with a pressure regulator which will maintain the pressures substantially constant. Valves for the controlled flow of the fluid are also provided and a gauge forms a part of the assembly. With tubing such as 13 suitably connected to this source of pressure and the valves opened, the gauge will register a certain pressure. Thereupon in the presence of heat, or by cold pressure, the bore of the metal tubings may be constricted. This constriction will be evidenced in a reduction in the air or liquid flow as indicated on the gauge. When the value of the pressure registered reaches a certain point then the constriction involves the required area. At that moment further constriction of the tube is interrupted. The section of tubing may then be severed and either applied as in Figs. 1, 2 or 5, be connected to a bulb portion 37 as in Fig. 8, or that bulb portion may be closed.

The general areas of the bore of the glass tube and the diameter of the constriction have heretofore been stated. The overall diameters of the tube or the mounting member 24 therefor may, of course, vary over a wide range. The overall diameter of the metallic tube or insert will, of course, be many times the area of bore 11. The outside diameter of that metallic tube may be on the order of .025" and it may have a normal internal diameter of around .015". As shown its length is such that it extends adjacent the base of recess 12. With constrictions of equal and proper area the difficulties heretofore arising in clinical thermometers incident to their being hard or free shakers are overcome. Also the problem of aging is largely avoided.

Thus, among others, the several objects of the invention as specifically aforenoted are achieved. Obviously numerous changes in construction and rearrangement of the parts might be resorted to without departing from the spirit of the invention as defined by the claims.

I claim:

1. A thermometer including a glass tube formed with a bore and a bulb, a metallic tube extending into and sealingly engaging said bore, said tube also extending into said bulb, a constriction forming a part of the bore of said metallic tube and appearing in the form of an indentation upon its outer face and the material of said glass tube keying into said indentation.

2. A clinical thermometer including in combination a stem formed with a capillary bore, a bulb fused to said stem in airtight relationship, said stem bore being enlarged at the end to which said bulb is connected, a tube projecting into the recess defined by such enlargement and sealingly contacting the surface thereof and said tube being formed with a constriction in its bore.

3. A clinical thermometer including in combination a stem formed with a capillary bore, a bulb fused to said stem in airtight relationship, said stem bore being enlarged at the end to which said bulb is connected, a tube projecting into the recess defined by such enlargement and sealingly contacting the surface thereof, said tube being formed with an indentation in its outer surface resulting in a constricted area of its bore and the material of said stem keying into said indentation.

4. A clinical thermometer including in combination a stem formed with a capillary bore, a bulb fused to said stem in airtight relationship, said stem bore being enlarged at the end to which said bulb is connected, a tube projecting into the recess defined by such enlargement and sealingly contacting the surface thereof adjacent one of its ends, said tube being formed with a constriction in its bore and the opposite end of said tube projecting into said bulb and in spaced relationship to the inner surfaces thereof.

5. A clinical thermometer including in combination a stem formed with a capillary bore, a bulb fused to said stem in airtight relationship, said stem bore being enlarged at the end to which said bulb is connected, a tube projecting into the recess defined by such enlargement and sealingly contacting the surface thereof, said tube being formed with a constriction in its bore and a washer disposed within said bulb transversely of the axis of the latter and in contact with the adjacent surface of said stem, said washer being formed with an opening through which said tube extends.

6. A thermometer including, in combination, a glass tube formed with a bore, a metallic tube disposed in line with and having an inner end connected to the surface of the bore of said glass tube adjacent one end of the latter, a constriction forming a part of said metallic tube and a bulb of metal having an open end sealed in air-tight relationship directly with the one end of said glass tube, said bulb enveloping the adjacent outer end of said metallic tube.

7. A thermometer including, in combination, a glass tube formed with a bore, a metallic tube disposed in line with and having an inner end connected to the surface of the bore of said glass tube adjacent one end of the latter, a constriction forming a part of said metallic tube and a bulb formed of glass having an open end sealed in air-tight relationship directly with the one end of said glass tube, said bulb enveloping the adjacent outer end of said metallic tube.

References Cited in the file of this patent

UNITED STATES PATENTS

| Number | Name | Date |
|---|---|---|
| 233,963 | Barry | Nov. 2, 1880 |
| 244,105 | Bahmann | July 12, 1881 |
| 1,358,372 | Johnson | Nov. 9, 1920 |
| 1,392,658 | Roesch | Oct. 4, 1921 |
| 1,811,190 | Tate | June 23, 1931 |
| 1,919,546 | Fletcher | July 25, 1933 |
| 1,945,434 | Greer | Jan. 30, 1934 |
| 2,225,513 | Summers | Dec. 17, 1940 |
| 2,267,556 | Eisele | Dec. 23, 1941 |
| 2,313,688 | Wappner et al. | Mar. 9, 1943 |
| 2,345,175 | Booth | Mar. 28, 1944 |
| 2,457,455 | Eisele | Dec. 28, 1948 |
| 2,460,051 | Welch | Jan. 25, 1949 |
| 2,578,563 | Liberatore | Dec. 11, 1951 |

FOREIGN PATENTS

| Number | Country | Date |
|---|---|---|
| 222,112 | Great Britain | Dec. 24, 1924 |